J. N. PARKER.
MOTOR PLOW.
APPLICATION FILED SEPT. 7, 1912.
1,075,061.
Patented Oct. 7, 1913.
2 SHEETS—SHEET 2.
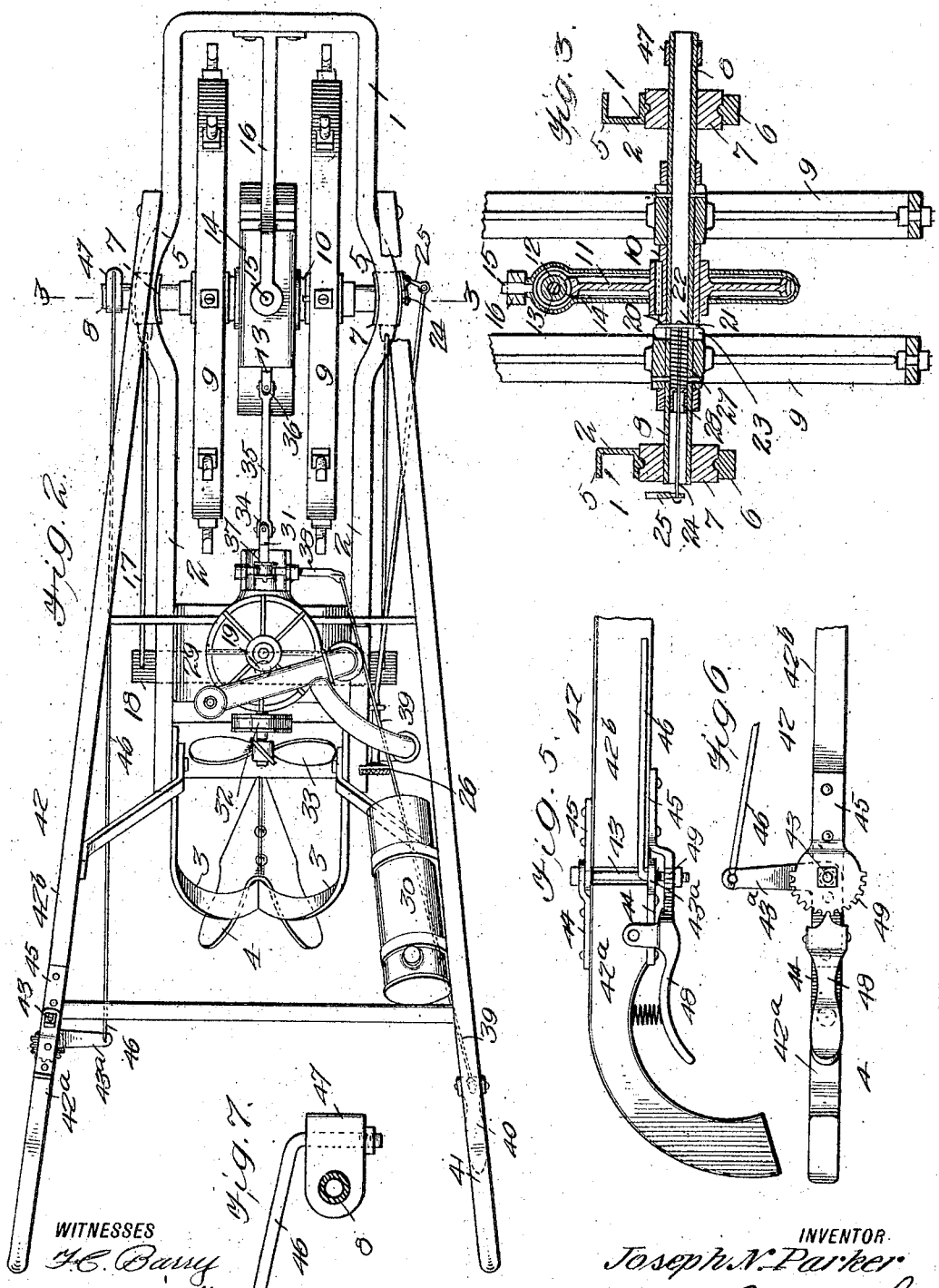
WITNESSES
INVENTOR
Joseph N. Parker
BY
ATTORNEYS

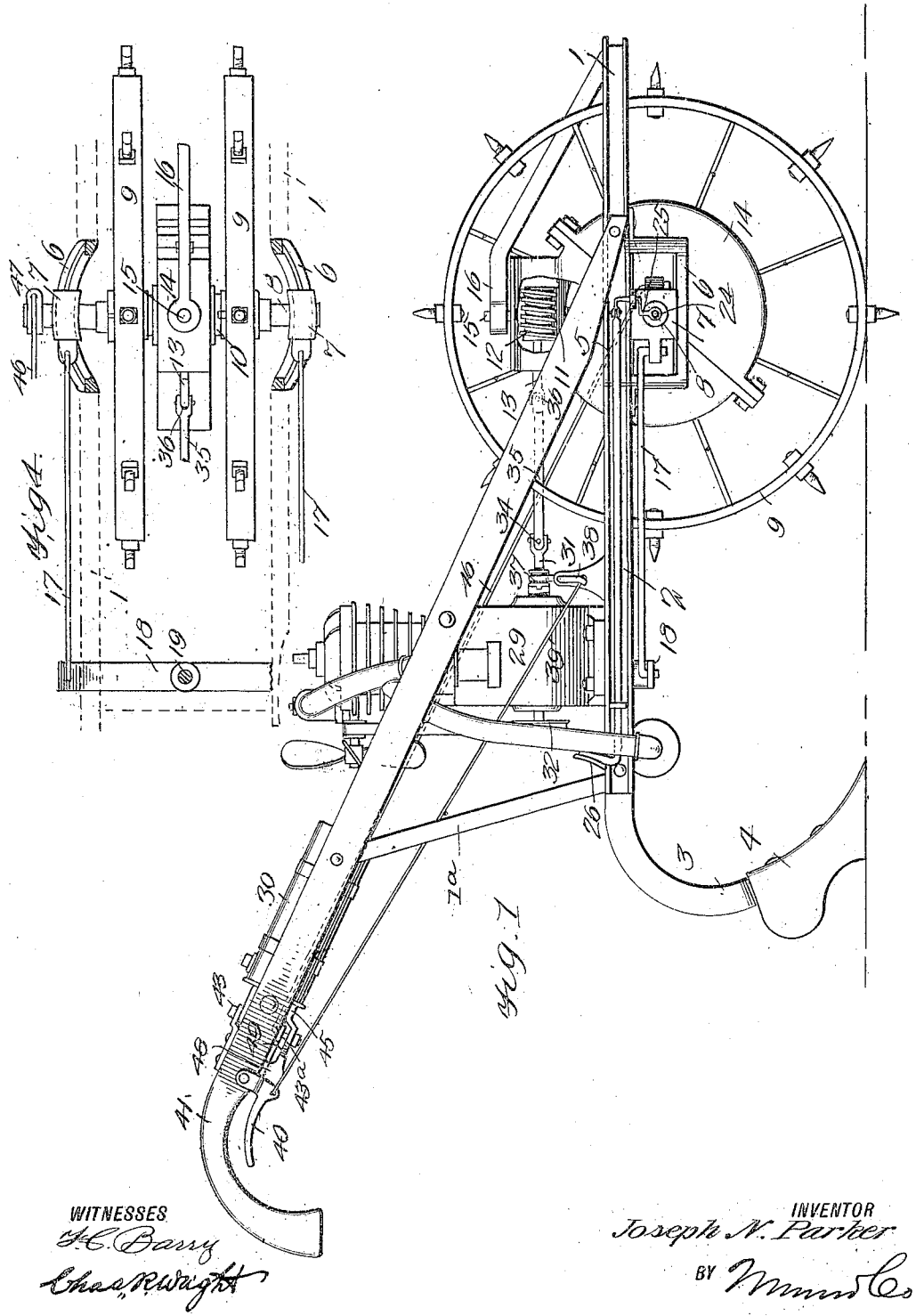

UNITED STATES PATENT OFFICE.

JOSEPH NICHOLAS PARKER, OF BEDFORD CITY, VIRGINIA.

MOTOR-PLOW.

1,075,061.   Specification of Letters Patent.   Patented Oct. 7, 1913.

Application filed September 7, 1912. Serial No. 719,131.

*To all whom it may concern:*

Be it known that I, JOSEPH N. PARKER, a citizen of the United States, and a resident of Bedford City, in the county of Bedford and State of Virginia, have invented an Improvement in Motor-Plows, of which the following is a specification.

My invention relates to motor plows such as shown and described in the application for Letters Patent Serial No. 655,270, filed by me October 18, 1911.

The object of the invention is to provide means by which the plow can be easily and readily guided.

A further object of the invention is to provide means whereby the wheel operating mechanism may be thrown out of gear, either by disconnecting the motor from the gearing or disconnecting one of the traction wheels from said gearing.

With these and other objects in view, the invention consists in the construction and arrangement of parts hereinafter fully described and pointed out in the claims.

Reference is to be had to the accompanying drawing forming a part of this specification, in which similar characters of reference indicate corresponding parts in all the views.

Figure 1 is a side elevation, partly broken away, of the improvement; Fig. 2 is a plan view; Fig. 3 is a transverse sectional view on line 3—3 of Fig. 2, parts being broken away; Fig. 4 is a detail plan view showing the sliding bearing blocks and their connection with the frame; Fig. 5 is a side view of a portion of the sectional handle and means for locking the same in position; Fig. 6 is an inverted plan view of the same; and Fig. 7 is a detail view.

Referring to the drawing, 1 is a U-shaped frame, to the rear ends of the members 2 of which are secured a shank 3 carrying a plow 4. The members 2 of the frame near their forward ends are curved outwardly at 5, and secured to the under side of the said members at the curved portions are correspondingly curved brackets 6. The brackets 6 form with the members of the frame guideways in which the bearing blocks 7 slide, the blocks being provided with curved grooves in their upper and lower faces to receive the brackets and the curved portions of the frame.

In the bearing blocks 7 a hollow axle 8 is mounted and to the axle within the frame the traction and steering wheels 9 are secured. The wheels 9 being rigidly connected with each other by the axle, they virtually form a single traction and steering wheel with a divided rim, but for convenience they are described as two wheels. Upon the axle 8 between the wheels 9 a sleeve 10 is loosely mounted, and splined to the sleeve 10 is a gear wheel 11 in mesh with the worm 12 on the shaft 13. The worm 12 and gear wheel 11 are inclosed in a casing 14 concentrically disposed about the axle. From the top of the casing 14 projects a pin 15 which turns in the rear end of a brace 16 whose forward end is secured to the forward end of the frame 1. By this means the axle and wheels are mounted to turn so as to swing to the right or left, as hereinafter described. To the blocks 7 rods 17 are secured and the rear ends of the rods are pivoted to the ends of the bar 18 mounted on the king bolt 19, upon which comes the whole pull of the traction wheels.

One end of the sleeve 10 is provided with a slot 20 to receive a pin 21 slidably mounted in a slot 22 of the axle 8 and adapted to engage a ratchet clutch 23 on the hub of one of the wheels 9. To the pin 21 within the axle 8 is secured a rod 24 which extends out through the end of the axle and its end is secured to one member of a bell crank lever 25 mounted on one of the bearing blocks 7, and to the other member of said bell crank lever a foot lever 26 is connected. The pin 21 is normally held in the slot of the sleeve 10 by a spring 27 surrounding the rod within the axle and having one end bearing against the pin 21 and its other end against a stop 28 within the end of the hollow axle.

Upon the frame between the handles is mounted a motor 29, preferably an air cooled internal combustion engine, and having a fuel supply tank 30. The shaft 31 of the motor has a fly wheel 32 on one end and its other end is coupled by means of a universal joint 34 to a shaft 35 which is coupled by a universal joint 36 to the shaft 13 of the worm 12. Upon the engine shaft 31 is a clutch 37, with the sliding member of which engages the forked end of the pivoted lever 38, and to the outer end of said lever is secured the forward end of the rod 39 whose outer end is attached to hand lever 40 mounted on one of the handles 41 of the plow. By operating the hand lever 40 the clutch 37 may be operated to disengage the motor from the wheel operating mechanism.

The handles 41 and 42 have their forward ends secured to the front end of the frame 1 and are connected with the rear end of the frame by braces 1ª. The handle 42 is made in sections pivoted together by a bolt 43. The bolt 43 is secured to plates 44 secured upon the upper and lower faces of the section 42ª of the handle and turns in plates 45 secured to the upper and lower faces of the handle section 42ᵇ. On the lower end of the bolt 43 is a crank arm 43ª and to this crank arm is secured a rod 46 whose forward end is secured in an eye 47 on one end of the axle 8. To the under side of the section 42ª is a pivoted and spring pressed lever 48 which engages a semicircular rack 49 on the under side of the section 42ᵇ of the handle. By operating the section 42ª of the handle 42, the axle will be swung, the blocks 7 sliding back and forth in their guideways and the plow turned to the right or left according to the direction the pivoted handle section 42ª is swung.

When it is desired to disengage the wheel operating mechanism from the motor, the hand lever 40 on the plow handle 41 will be operated so as to operate the clutch 37, but when it is desired to disconnect the traction wheels from the gearing, the foot lever 26 will be operated, when the pin 21 will be moved out of the slot of the sleeve 10 into engagement with the ratchet teeth of the wheel hub. This gearing will then continue to rotate without actuating the wheels. The hand lever 40 will ordinarily be used for throwing the parts out of gear; but when the plow is to be moved when the motor is not running, or to move the plow backward at corners or at the end of a row, then the foot lever 26 is used.

I claim:—

1. In a motor plow, a frame, sliding bearing blocks mounted in the forward part of the frame, an axle mounted in the said blocks, traction wheels on the axle, a gear casing disposed concentrically on the axle between the wheels and pivoted to the frame, gearing in said casing, a clutch for connecting the gearing with the axle, a motor on the frame for operating the gearing, and means for swinging the axle.

2. In a motor plow, a frame, handles secured to the frame, sliding bearing blocks mounted in the forward part of the frame, an axle mounted in the bearing blocks, traction wheels on the axle, a gear casing disposed concentrically on the axle between the wheels and pivoted to the frame, gearing in the casing, a clutch for connecting the gearing with the axle, a motor on the frame for operating the gearing, and means for swinging the axle from one of the plow handles.

3. In a motor plow, a frame, handles secured to the frame, sliding bearing blocks at the forward part of the frame, an axle mounted in the bearing blocks, traction wheels on the axle, a gear casing disposed concentrically on the axle between the wheels and pivoted to the frame, gearing in the casing, a clutch between the gearing and axle, a motor on the frame for operating the gearing, means for swinging the axle from a handle of the plow, and means for throwing the wheel operating mechanism out of gear.

4. In a motor plow, a frame, handles secured to the frame, sliding bearings at the forward part of the frame, a pivoted bar, links connecting the bar with the bearing blocks, an axle mounted in the bearings, traction wheels on the axle, a gear casing disposed concentrically on the axle and pivoted to the frame, gearing in the casing, a clutch for connecting the gearing with the axle, a motor on the frame for operating the gearing, and means connected with one end of the axle for swinging the same from a handle of the plow.

5. In a motor plow, a frame, handles on the frame, one of the handles having a pivoted section, sliding bearings at the forward end of the frame, an axle mounted in the bearings, a gear casing concentric with the axle and pivoted to the frame, gearing in the casing for operating the axle, a motor for operating the gearing, traction wheels on the axle, and a connection between the axle and the pivoted section of the handle.

6. In a motor plow, a frame provided with guideways, sliding bearing blocks in the guideways, a pivoted bar, links connecting the ends of the bar with the bearing blocks, an axle mounted in the bearing blocks, traction wheels on the axle, a casing on the axle and pivoted to the frame, mechanism in the casing for operating the wheels, and means connected with one end of the axle for swinging the same.

7. In a motor plow, a frame, handles secured to the frame, one of the handles having a pivoted section, the pivot of the said section having a crank arm, sliding bearing blocks on the frame, an axle mounted in the blocks, traction wheels on the axle, a gear casing pivoted to the frame, gearing in the casing for operating the wheels, a connection between the crank arm of the pivot of the said handle section and one end of the axle, and means for locking the pivoted handle section in position.

8. In a motor plow, a frame having a rearwardly extending and apertured brace at its forward end, sliding bearing blocks on the frame, a pivoted bar, links connecting the bar with the bearing blocks, an axle mounted in the bearing blocks, traction wheels on the axle, a gear casing on the axle and having a pivot projecting into the aperture of the brace, gearing in the casing for operating the axle, and means connected with one end of the axle for swinging the same.

9. In a motor plow, a frame, an axle mounted to swing and having its ends mounted in sliding bearings, traction wheels on the axle, a gear casing on the axle, a motor, gearing in the casing for operating the wheels from the motor, means for disconnecting the motor from the gearing, and means for disconnecting the traction wheels from the said gearing.

10. In a motor plow, a frame, an axle mounted in the frame to swing, traction and steering wheels on the axle, means for operating the axle, and a connection between the ends of the axle and the frame whereby a direct pull is exerted on the frame from the axle.

11. In a motor plow, a frame, an axle mounted in the frame to swing, traction and steering wheels on the axle, means for operating the axle, a centrally pivoted member on the frame, and links connecting the ends of the axle with the ends of the said pivoted member.

12. In a motor plow, a frame, an axle, means for pivotally mounting the axle in the frame, sliding bearings on the frame and in which the ends of the axle are mounted, a centrally pivoted bar on the frame in the rear of the axle, links pivoted to the ends of the bar and to the sliding bearings, traction and steering wheels on the axle, and means for operating the axle.

13. In a motor plow, a frame, an axle, means for pivotally mounting the axle in the frame, sliding bearings on the frame and in which the ends of the axle are mounted, a centrally pivoted bar on the frame in rear of the axle, links pivoted to the ends of the bar and to the sliding bearings, traction and steering wheels on the axle, a motor on the frame, gearing between the motor and axle, and means for swinging the axle.

14. In a motor plow, a frame, handles on the frame, one of the handles having a pivoted section, an axle pivotally mounted in the frame, a motor, means for operating the axle from the motor, traction and steering wheels on the axle, and a connection between the ends of the axle and the pivoted section of the handle.

15. In a motor plow, a frame, an axle, traction and steering wheels on the axle, a gear casing on the axle between the wheels and pivoted to the frame, gearing in the gear casing for operating the axle, a motor on the frame, a shaft having a universal joint connection with the shaft of the motor and the shaft of one of the gear wheels of the said gearing, and means for swinging the axle.

JOSEPH NICHOLAS PARKER.

Witnesses:
W. P. HURT,
A. J. COUTHORN.